United States Patent [19]

Schattenberg et al.

[11] Patent Number: 5,277,365
[45] Date of Patent: Jan. 11, 1994

[54] FUEL TAPPING DEVICE FOR A MOTOR VEHICLE HEATER

[75] Inventors: Frank Schattenberg, Neubrandenburg; Wilhelm Kohlberger, Landsberg, both of Fed. Rep. of Germany

[73] Assignee: Webasto Thermosysteme GmbH, Stockdorf, Fed. Rep. of Germany

[21] Appl. No.: 29,628

[22] Filed: Mar. 11, 1993

[30] Foreign Application Priority Data

Mar. 12, 1992 [DE] Fed. Rep. of Germany ....... 4207884

[51] Int. Cl.⁵ .............................................. B60K 15/01
[52] U.S. Cl. .............................. 237/12.3 C; 137/315
[58] Field of Search .................. 237/12.3R, 12.3A, 12.3B, 12.3C; 126/350A;

[56] References Cited

U.S. PATENT DOCUMENTS 2,290,227  7/1942  Fairbanks ..................... 237/12.3 C

FOREIGN PATENT DOCUMENTS 3821827  2/1991  Fed. Rep. of Germany .

OTHER PUBLICATIONS

"Short Installation Proposal For Air Heaters", Webasto, 1991, Identification No. 770941.
"Installation Instruction", Webasto, 1989, Identification No. 238224.

*Primary Examiner*—Henry A. Bennet
*Attorney, Agent, or Firm*—Sixbey, Friedman, Leedom & Ferguson

[57]  ABSTRACT

A fuel tapping device for an engine-independent, auxiliary motor vehicle heater is provided which taps fuel from a fuel storage tank of a motor vehicle fuel supply unit and feeds the fuel to the motor vehicle heater by a connecting pipe. This fuel tapping device has a flexible pipe which has a smallest possible cross section and which is placed in a fuel pipe part that projects into the fuel storage tank so that its free end extends to near the bottom of the fuel storage tank. The fuel tapping device can comprise an intermediate piece, which can be Y-shaped, and uses a branch leg for catheter-like insertion of the flexible pipe. As an alternative, the fuel tapping device can also be designed so that the flexible pipe is fixed in the intermediate piece and forms a preassembled unit with it.

23 Claims, 1 Drawing Sheet

FUEL TAPPING DEVICE FOR A MOTOR VEHICLE HEATER

BACKGROUND OF THE INVENTION

The invention relates to a fuel tapping device for a motor vehicle heater which taps fuel from a fuel storage tank of a motor vehicle's fuel supply unit and feeds the fuel to the motor vehicle heater by a connecting pipe.

To tap fuel from the motor vehicle's fuel supply unit for an auxiliary motor vehicle heater that is able to be operated independently of the vehicle engine, there are several possibilities. Devices designed as so-called tank taps for tapping fuel can be gathered from the bibliographic reference of Webasto "Short Installation Proposal for Air Heaters" with identification number 770941, printed in the year 1991. In cases of fuel storage tanks made of plastic, of a motor vehicle's fuel supply unit, the tapping of fuel takes place by a hollow screw with a circular tube piece, which is replaced by the usually present drain plug on the underside of the fuel storage tank. Such a tapping of fuel is subject to risks with respect to safety since fuel can run out into the motor vehicle heater in the case of damage to the fuel pipe. Further, for installation, the fuel storage tank has to be completely emptied. As a result, the installation of such a fuel tap is expensive.

In the situation where the fuel storage tank of a motor vehicle's fuel supply unit is formed of metal, an additional opening can be drilled in the tanks, into which a corresponding tank tap can be inserted which serves to supply the motor vehicle heater with fuel. When the bore is drilled in the fuel storage tank, chips can drop into the tank, and these chips can cause the fuel supply to be interrupted. There is also the danger of a sparking during drilling, so that such an installation involves a certain safety risk when installation is performed after a vehicle has been put into use (i.e., retrofit installation instead of assembly line installation). Further, there is also the fact that, depending on the design of the motor vehicle, as in platform vehicles, the fuel storage tank can be difficult to access from above, so that in the extreme case, even the entire fuel storage tank has to be removed.

Further, in bibliographic reference "Installation Instructions" of Webasto with identification number 238224, published in the year 1989, a fuel tap is described on page 9 which is designed as a T-piece and is placed in the fuel feed pipe leading from the fuel storage tank to the internal combustion engine to create a branch to a metering pump for the auxiliary heater. But, in such a fuel tap, the fuel supply of the auxiliary motor vehicle heater is exposed to pressure fluctuations, which unavoidably occur in the motor vehicle's fuel supply unit. As a result, trouble disconnections of the auxiliary motor vehicle heater can occur, and further, a fuel metering pump has to be used with the auxiliary motor vehicle heater to assure as reliable and uniform as possible a fuel supply.

SUMMARY OF THE INVENTION

In view of the foregoing, a primary object of the present invention is to provide a fuel tapping device for a motor vehicle heater which permits a reliable fuel supply independent of the design of the fuel storage tank and of the conditions of the motor vehicle's fuel supply unit.

It is a further object of this invention to achieve the preceding object in a way that allows installation of the fuel tapping device in a relatively inexpensive manner.

According to the invention, the foregoing objects are achieved in accordance with preferred embodiments of a fuel tapping device for a motor vehicle heater which are particularly suitable for tapping fuel from a fuel storage tank of a motor vehicle's fuel supply unit and feeding the fuel to the motor vehicle heater by a connecting pipe. More specifically, a flexible pipe of the smallest possible cross section is placed in a fuel pipe part which projects into the fuel storage tank so that its free end extends to near the bottom of the fuel storage tank and which forms at least a part of the connecting pipe leading to the motor vehicle heater.

In the fuel tapping device according to the invention, a flexible pipe or a flexible tube is, thus, inserted like a catheter into a fuel pipe part of the motor vehicle's fuel supply unit, and fuel can be tapped directly from the fuel storage tank by this flexible pipe, without an additional opening having to be provided in the fuel storage tank or a drain plug of the fuel storage tank having to be replaced by a tank tap. In this way, in the fuel tapping device according to the invention, a fuel supply is provided to the auxiliary motor vehicle heater substantially independent of the motor vehicle's fuel supply unit, and the installation of this fuel tapping device can be performed at an easily accessible point, for example, at a pipe near the fuel storage tank.

To install the fuel tapping device, only the assigned fuel pipe section has to be separated and the flexible pipe can then be inserted in the desired way. The installation of the fuel tapping device according to the invention is not only relatively simple but also extremely reliable.

Preferably, the cross section of the flexible pipe, relative to the inner cross section of the fuel pipe part, occupies about 20% or less. In particular, the flexible pipe has an outside diameter of about 3 mm or smaller. By this design of the flexible pipe of the fuel tapping device according to the invention, an impairment that can cause trouble for the fuel supply of the internal combustion engine can be reliably avoided by the motor vehicle's fuel supply unit and at the same time, a sufficient and reliable fuel supply of the motor vehicle heater is assured with the help of the fuel tapping device according to the invention.

For simplified installation of the fuel tapping device, the latter is preferably designed in the form of an intermediate piece, which can be inserted in the fuel pipe section of the motor vehicle's fuel supply unit outside the fuel storage tank. As a result, even a later installation of such a fuel tapping device is simplified since a premanufactured intermediate piece can be installed after separation of the fuel pipe part from the motor vehicle's fuel supply unit.

According to an embodiment of the invention, the design of the fuel tapping device is made so that, after the installation of the intermediate piece, the flexible pipe can be inserted in such a way that its free end extends to near the bottom of the fuel storage tank. An intermediate piece suitable for this purpose can be Y-shaped, and a branch leg of the Y is used for supplying fuel to the motor vehicle heater. After insertion of the flexible pipe by this branch leg of the Y-shaped intermediate piece, the flexible pipe can then be fixed in the intermediate piece in a liquid-tight and fuel-tight manner. Optionally, it is also possible to use the flexible pipe directly as a connecting pipe, which is connected to the fuel supply device of the motor vehicle heater. In this way, coupling pieces or the like between the fuel tapping device and the motor vehicle heater can then be eliminated.

In an alternative design of the fuel tapping device according to the invention, the flexible pipe forms a subassembly with the intermediate piece. This subassembly can consist of several parts and be preassembled.

Independent of the design of the intermediate piece, it is preferably produced from plastic.

In the design of the intermediate piece as a subassembly with the flexible pipe, the intermediate piece can comprise a metal part for the fuel distribution to the motor vehicle heater, in which the flexible pipe ends and is fixed there. In this design, the intermediate piece can be examined for its leak tightness before installation, so that a fuel tapping device operating as reliably as possible is obtained.

In this design with the metal part, a pressure part, at least partially surrounding the intermediate piece, preferably, is used to insure a fuel-tight connection of the intermediate piece to the motor vehicle's fuel pipe part. In this case, an adapter nipple for a connecting pipe leading to the motor vehicle heater can be connected with the metal part. In this way, at the same time, the possibility for connecting the connecting pipe is also integrated in the intermediate piece of the fuel tapping device, which leads to the motor vehicle heater. By the combination of plastic and metal parts, an extremely reliable, tight closure for the pipes to be connected can be provided in this design without any great danger of the formation of leaks.

The fuel tapping device according to the invention can be placed in the return pipe leading to the fuel storage tank or in the flow pipe coming from the fuel storage tank, which is used for fuel supply to the internal combustion engine. Thus, the fuel tapping device according to the invention can be installed without difficulties at as easily accessible a point as possible in a universal way even in case of a retrofit installation.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
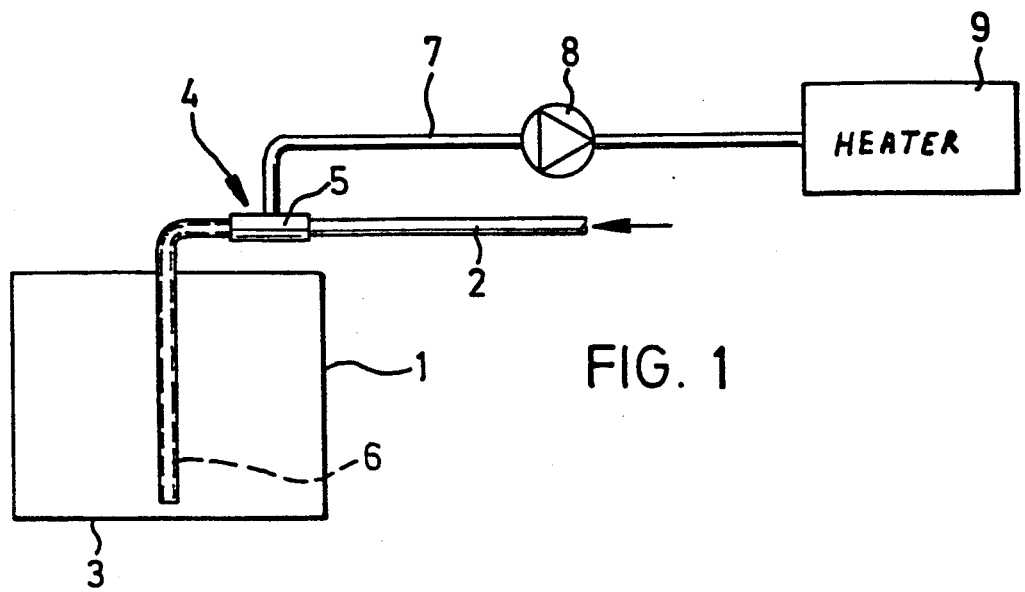
FIG. 1 is a diagrammatic view of an area of a motor vehicle's fuel supply unit near a fuel storage tank with a fuel tapping device according to the invention.

In the figures of the drawing, the same or similar parts are provided with the same reference symbols, with prime designations (', ") being used to distinguish between embodiments.

In FIG. 1, a fuel storage tank, which can be produced from plastic or metal, is designated 1, and a fuel pipe 2 extends into the tank so that its free end is disposed somewhat above the bottom 3 of fuel storage tank 1. This fuel storage tank 1 is placed in the motor vehicle at a suitable point, which can change from motor vehicle type to motor vehicle type and from manufacturer to manufacturer. Therefore, specifics relating to the motor vehicle are not shown in detail. With the example shown in FIG. 1, the fuel pipe 2 is indicated as conducting a return flow of fuel from the internal combustion engine (not shown) into the interior of fuel storage tank 1; although, fuel pipe 2, as shown in FIG. 1, could just as easily be a fuel feed pipe for supplying fuel to the internal combustion engine or its supply devices (e.g., a fuel injection system) without changing any of the features shown.

A fuel tapping device, as a whole, is indicated by reference numeral 4. Fuel tapping device 4 is made in the form of an intermediate piece 5, which in the case of the example shown in FIG. 1, is placed in the area of fuel pipe 2 outside of the fuel storage tank, but near it. A flexible pipe 6, which passes through the fuel tapping device 4 within fuel pipe 2 and also extends to near the bottom 3 of fuel storage tank 1, is diagrammatically indicated with dashed lines. This pipe 6 can be a flexible tube piece which, for example, has a diameter of 3 mm or less, may be connected directly or by an intermediate connection, as this is described in more detail below, with a connecting pipe 7. Connecting pipe 7 is connected by a fuel pump 8 with an auxiliary heater 9 that is able to be operated independently of the vehicle engine, to supply fuel from the motor vehicle's fuel supply unit.

Figure 2:
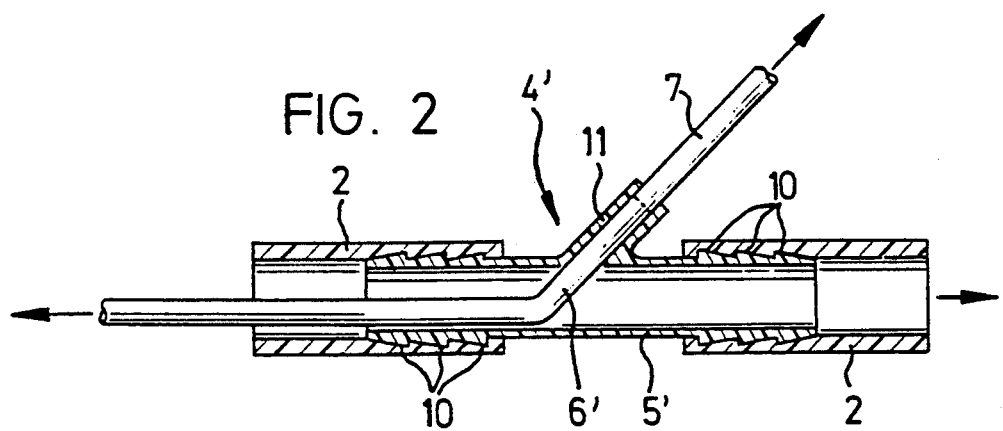
FIG. 2 is a partial representation of a first embodiment of a fuel tapping device according to the invention.

With reference to FIG. 2, a first preferred embodiment of a fuel tapping device 4' will now be explained. Tapping device 4' is installed at the point, shown in FIG. 1, for example, in fuel pipe 2 of the motor vehicle's fuel supply unit.

Fuel tapping device 4' comprises an intermediate piece 5' which is generally Y-shaped, and preferably formed of plastic. Frustoconical annular projections 10 are provided on the two opposite ends of Y-shaped intermediate piece 5' which can be driven into the sections of fuel pipe 2 after it has been cutting through. In this way, intermediate piece 5' is seated securely for forming a tight closure in the sections of fuel pipe 2. Flexible pipe 6' can then be introduced and pushed in, like a catheter, after the installation of intermediate piece 5', starting from branch leg 11 of intermediate piece 5', until its free end, shown in FIG. 1, extends to near the bottom 3 of the fuel storage tank 1. After the flexible pipe 6' is introduced into the fuel pipe 2, it is fixed in the area of branch leg 11 of intermediate piece 5', so that there is a tight connection between flexible pipe 6' and branch leg 11.

In FIG. 2, flexible pipe 6' is shown going directly to the corresponding supply connection of motor vehicle heater 9, and thus, also forms the connecting pipe 7 shown in FIG. 1. However, as represented by a dashed line, it is also possible for the flexible pipe 6' to end inside of the branch leg 11 of the Y-shaped intermediate piece 5' and be fixed there. In such a case, a connecting pipe 7 is then be connected to the free end of branch leg 11 for the establishment of a liquid-conducting connection from pipe 6' to the motor vehicle heater 9.

As noted, intermediate piece 5' is, preferably, produced from plastic. However, it can, of course, also be produced from metal or a combination of metal and plastic, or any other material which is able to chemically resist attack by the fuel.

Figure 3:
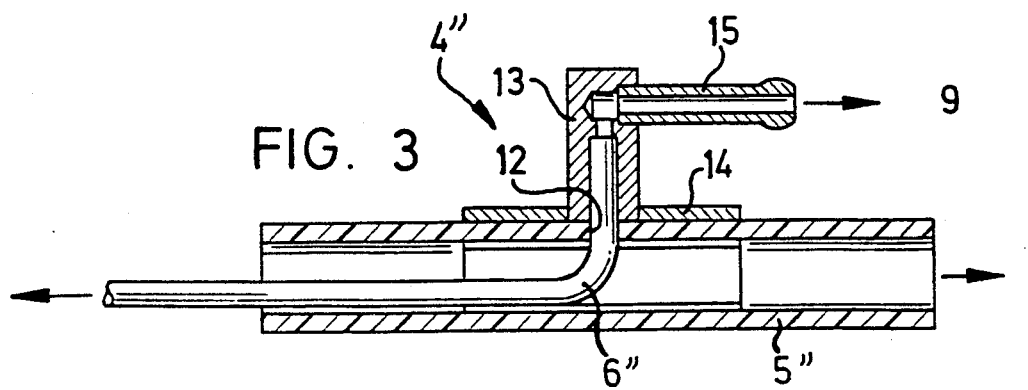
FIG. 3 is a longitudinal section view like that of FIG. 2, but of a second embodiment of a fuel tapping device according to the invention.

In FIG. 3, an alternative embodiment of a fuel tapping device 4" is shown. This fuel tapping device 4" comprises an intermediate piece 5", which is formed, for example, of a rubber tube section, which is connected with the corresponding cut-through sections of fuel pipe 2. Intermediate piece 5" is designed as a fuel tube section, which has a through-opening 12 in its jacket surface. Further, fuel tapping device 4" comprises a distribution part 13, which for reasons of stability is preferably produced from metal and which is connected with a pressure part 14 which suitably is made as a thin sheet part and at least partially encloses intermediate piece 5". An end of a flexible pipe 6" is tightly fixed in a bore of distribution part 13. Flexible pipe 6" goes from this distribution part 13 through through-opening 12, and then, extends through the interior of intermediate piece 5". This flexible pipe 6" then follows the path illustrated in FIG. 1, and its other end (which is not represented in FIG. 2) extends to near the bottom 3 of the fuel storage tank. In this design, flexible pipe 6" forms a subassembly, with intermediate piece 5", which can be premanufactured. An adapter nipple 15, with which a hose line or the like can be connected in the usual way, forms a connector for attachment of the connecting pipe 7, which leads to motor vehicle heater 9, to the distribution part 13.

As can be gathered from the representations in the figures, the cross-sectional area of the flexible pipe 6, 6', 6" occupies about 20% or less of the inside cross section of intermediate piece 5, 5', 5" or the inside cross section of fuel pipe 2. As a result, the flow of fuel for the fuel supply of the internal combustion engine is hardly obstructed at all, and is not adversely affected. But, the flow of fuel in flexible pipe 6, 6', 6" is also, basically, independent of the pressure conditions, for example, in return pipe 2 or in the feed pipe for the fuel supply unit of the motor vehicle. Fuel tapping device 4, 4', 4", according to the invention, therefore, permits a fuel supply to motor vehicle heater 9 that is reliable and substantially independent of the fuel supply of the internal combustion engine. Moreover, the fuel for motor vehicle heater 9 is tapped directly from fuel storage tank 1. At the same time, fuel tapping device 4, 4', 4" can also be easily installed, since only the fuel-conducting pipe near fuel storage tank 1 of the motor vehicle fuel supply unit needs to be cut through, and then, fuel tapping device 4, 4', 4" can be installed easily and quickly in next to no time, without alterations needing to be made to fuel storage tank 1 or associated devices. In particular, fuel tapping device 4, 4', 4" can be used almost universally independent of the material from which fuel storage tank 1 is produced. Further, the installation site for fuel tapping device 4, 4', 4" can always be selected so that it lies at an easily accessible location to simplify the installation.

Of course, the invention is not limited to the above-described details of the preferred embodiments, but numerous changes and modifications are possible which one skilled in the art will make, if necessary, without leaving the scope of the invention. In particular, a combination of the materials used for the individual parts of fuel tapping device 4, 4', 4" can also be used, and/or the design of the preferred embodiments can be made, so that selectively flexible pipes 6, 6', 6" can be used securely seated or such pipes can produce a direct connection with motor vehicle heater 9 to be supplied.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intended to cover all such changes and modifications as are encompassed by the scope of the appended claims.

We claim:

1. Fuel tapping device for an engine-independent, auxiliary motor vehicle heater, by which fuel is fed from a fuel storage tank of a motor vehicle fuel supply unit to the motor vehicle heater by a connecting pipe, comprising a flexible pipe which extends within a fuel pipe section which projects into a fuel storage tank pipe, a free end of the flexible pipe being located near a bottom wall of the fuel storage tank; said flexible pipe having a smallest possible cross section capable of providing sufficient fuel to the vehicle heater and forming at least a part of said connecting pipe by which fuel is fed to the motor vehicle heater.

2. Fuel tapping device according to claim 1, wherein the flexible pipe has a cross section which occupies about 20% or less of an inner cross-sectional area of the fuel pipe section.

3. Fuel tapping device according to claim 2, wherein the flexible pipe has a diameter of about 3 mm or less.

4. Fuel tapping device according to claim 2, wherein the fuel tapping device is an intermediate piece which is inserted in the pipe section of the motor vehicle fuel supply unit outside of the fuel storage tank.

5. Fuel tapping device according to claim 4, wherein the flexible pipe is insertable into the pipe section after installation of an intermediate piece.

6. Fuel tapping device according to claim 4, wherein the flexible pipe forms a subassembly with the intermediate piece.

7. Fuel tapping device according to claim 6, wherein the intermediate piece is formed of plastic.

8. Fuel tapping device according to claim 6, wherein the intermediate piece comprises a metal part in which an end of the flexible pipe is fixed.

9. Fuel tapping device according to claim 8, wherein a pressure part at least partially surrounds the intermediate piece and is connected with the metal part in a manner forming a fueltight connection of an intermediate piece to the motor vehicle fuel pipe.

10. Fuel tapping device according to claim 9, wherein an adapter nipple for a connecting tube leading to motor vehicle heater is connected with the metal part.

11. Fuel tapping device according to claim 4, wherein the intermediate piece is approximately Y-shaped, having a main passage and a branch leg; and wherein the branch leg of the Y-shape supplies fuel to the motor vehicle heater.

12. Fuel tapping device according to claim 1, wherein the fuel tapping device is located in a fuel return pipe of the motor vehicle fuel supply unit which leads to the fuel storage tank.

13. Fuel tapping device according to claim 1, wherein the fuel tapping device is placed in a feed pipe of the motor vehicle fuel supply unit which comes from fuel storage tank.

14. Fuel tapping device according to claim 1, wherein the fuel tapping device is an intermediate piece which is inserted in the pipe section of the motor vehicle fuel supply unit outside of the fuel storage tank.

15. Fuel tapping device according to claim 14, wherein the flexible pipe is insertable into the pipe section after installation of an intermediate piece.

16. Fuel tapping device according to claim 14, wherein the flexible pipe forms a subassembly with the intermediate piece.

17. Fuel tapping device according to claim 16, wherein the intermediate piece is formed of plastic.

18. Fuel tapping device according to claim 16, wherein the intermediate piece comprises a metal part in which an end of the flexible pipe is fixed.

19. Fuel tapping device according to claim 18, wherein a pressure part at least partially surrounds the intermediate piece and is connected with the metal part in a manner forming a fueltight connection of the intermediate piece to the motor vehicle fuel pipe.

20. Fuel tapping device according to claim 19, wherein an adapter nipple for a connecting tube leading to motor vehicle heater is connected with the metal part.

21. Fuel tapping device according to claim 14, wherein the intermediate piece is approximately Y-shaped, having a main passage and a branch leg; and wherein the branch leg of the Y-shape supplies fuel to the motor heater.

22. Engine-independent auxiliary motor vehicle heater system comprising an engine-independent, auxiliary motor vehicle heater, a fuel storage tank, and a fuel tapping device by which fuel is fed from the fuel storage tank to the motor vehicle heater by a connecting pipe, said fuel tapping device having a flexible pipe which extends within a fuel pipe section which projects into a fuel storage tank pipe, a free end of the flexible pipe being located near a bottom wall of the fuel storage tank; said flexible pipe having a smallest possible cross section capable of providing sufficient fuel to the vehicle heater and forming at least a part of said connecting pipe by which fuel is fed to the motor vehicle heater.

23. Engine-independent auxiliary motor vehicle heater system according to claim 22, wherein the fuel tapping device is an intermediate piece which is inserted in the pipe section of the motor vehicle fuel supply unit outside of the fuel storage tank.

* * * * *